United States Patent [19]

Bodor et al.

[11] Patent Number: 4,591,507

[45] Date of Patent: May 27, 1986

[54] EDIBLE WATER-IN-OIL EMULSION SPREADS CONTAINING HYDRATED STARCH PARTICLES DISPERSED IN THE AQUEOUS PHASE

[75] Inventors: Janos Bodor, The Hague; Lammert Heslinga, Maassluis; Jan van Heteren, Vlaardingen; Bartholomeus de Vries, Arnhem, all of Netherlands

[73] Assignee: Lever Brothers Company, New York, N.Y.

[21] Appl. No.: 677,005

[22] Filed: Nov. 30, 1984

[30] Foreign Application Priority Data

Dec. 1, 1983 [NL] Netherlands ..................... 8304133

[51] Int. Cl.$^4$ ........................... A23D 3/00; A23D 3/02
[52] U.S. Cl. ..................................... 426/604; 426/661
[58] Field of Search .............. 426/602, 603, 604, 605, 426/613, 578, 661

[56] References Cited

U.S. PATENT DOCUMENTS

| 4,104,212 | 8/1978 | Bruner | 426/578 X |
| 4,423,084 | 12/1983 | Trainor et al. | 426/604 X |
| 4,492,714 | 1/1985 | Cooper et al. | 426/613 X |

FOREIGN PATENT DOCUMENTS

| 11891 | 6/1980 | European Pat. Off. . |
| 262880 | 5/1964 | Netherlands . |
| 2057848 | 4/1981 | United Kingdom . |

OTHER PUBLICATIONS

Uzzan, et al., "Additifs Nouveau en Marginerie: Evolution en Fonction de la Legislation Presente et a Venir", Revue Francaise des Corps Gras 19, Sep. 1972, 513–521.

*Primary Examiner*—Robert Yoncoskie
*Attorney, Agent, or Firm*—James J. Farrell; Lynne Darcy

[57] ABSTRACT

Edible water-in-oil emulsion spreads displaying good organoleptic properties, microbiological stability and release of flavouring ingredients are produced by incorporating, as a component of the dispersed phase of the emulsion, hydrated, non-crystalline, intact, undissolved starch particles.

17 Claims, No Drawings

EDIBLE WATER-IN-OIL EMULSION SPREADS CONTAINING HYDRATED STARCH PARTICLES DISPERSED IN THE AQUEOUS PHASE

The present invention relates to edible water-in-oil emulsion spreads of the margarine-type and of the reduced fat spread-type containing undissolved, hydrated starch particles dispersed in the aqueous phase.

By spreads of the margarine-type are understood spreads wherein the fatty phase constitutes 80–90% of the total emulsion.

By reduced fat spreads are understood spreads wherein the fatty phase constitutes 20–70% of the total emulsion.

It is known to use starch for increasing the viscosity of the aqueous phase of emulsions in order to stabilize emulsions, particularly in order to prevent water exudation. In this case the starch largely dissolves in the aqueous phase and gelatinization is complete. Enzyme-treated starches, starches decomposed with acids, pre-gelatinized starches are also examples of soluble starches which have been used in emulsions.

The application of such starches reduces the hardness of the product, leading to undesirable softness and oil separation in the higher temperature range.

On the other hand it is known to use an ether derivative of starch which is completely non-swelling, even in hot water. NL-A-262 880 describes the use of such starch in order to improve the spattering behaviour of margarine. Such non-swollen starches impart a mealy sensation to the margarine.

European patent application No. 0011891 describes the use of gelled, spherical ingredients having a diameter of 10–20 microns, which may consist of gelatin, agar, alginate, carrageenan and which are present, along with the free aqueous phase, as the dispersed phase of w/o-emulsions. The process requires the use of 2 separate Votator apparatuses wherein a gelled and a non-gelled aqueous phase are processed separately.

There is a need for w/o-emulsion spreads which display (i) a good spattering behaviour when used for shallow frying;

(ii) good organoleptic properties on consumption, by which term we mean that the emulsion easily breaks in the mouth, thereby releasing salt, proteins and other flavouring ingredients, and (iii) a good microbiological stability on storage.

Applicants have found edible emulsion spreads which meet the above combination of desiderata to a great extent.

The edible water-in-oil emulsion spreads according to the invention comprise a continuous fat phase and a dispersed phase, 15–80% by volume of which is present in the form of intact, non-crystalline, hydrated, undissolved starch, the remainder of the volume of the dispersed phase being present as the free aqueous phase.

By intact, non-crystalline, hydrated starch is meant that the starch is partially swollen by the aqueous phase, i.e. it is swollen to a sub-maximal degree, thereby avoiding desintegration and ultimately dissolution of the starch in said aqueous phase.

A very suitable degree of swelling is reached when hydration is carried out up to the point where the starch does not display birefringence any more, i.e. when it becomes non-crystalline and that such hydrated starch remains substantially undissolved in the aqueous phase of the emulsion, which means that preferably less than about 10% of the starch is present in the dissolved state.

In the edible w/o-emulsion spreads according to the invention the hydrated starch particles preferably constitute 25–70% and ideally 35–60% by volume of the dispersed phase.

In edible w/o-emulsion spreads of the margarine-type wherein the fatty phase constitutes 80–90% by weight of the total emulsion, the hydrated starch particles will be present in an amount ranging from 1.5–16% by weight based on the total emulsion, the remainder of the dispersed phase consisting of free aqueous phase.

In edible w/o-emulsion spreads of the reduced fat spread-type wherein the fatty phase may constitute 20–70% by weight, the hydrated starch will be present in an amount ranging from 4.5–65% by weight, based on the total weight of the emulsion, the remainder of the dispersed phase consisting of free aqueous phase.

The free aqueous phase will predominantly be present as drops having a diameter ranging from 1–10 microns, finely dispersed in the continuous fat phase.

The diameter of the hydrated starch particles can vary within wide ranges depending on the kind of starch used and its capacity of absorbing the aqueous phase, while remaining intact, i.e. with as little desintegration as possible on contact with the aqueous phase, during processing and subsequently during storage.

In general the hydrated starch particles will have a diameter ranging from 3–100 microns, and preferably from 10–60 microns. The starch particles hydrated to a sub-maximal degree of swelling may be present as discrete particles or in the form of agglomerates or aggregates. It is believed that such particles or aggregates are mechanically strong enough to retain water when present in the "state of rest" but that they easily desintegrate in the presence of saliva and under the influence of shearing forces prevailing in the mouth.

The starch may be any natural starch and particularly any one selected from the group consisting of rice starch, oat starch, corn starch and wheat starch.

The starch may consist of a modified starch. Cross-linked starches are particularly preferred, owing to the property of the swollen starch of remaining intact during texturization treatments, which are applied when the w/o-emulsions are converted into plastic spreads. Such treatments include churning operations and processing, using apparatuses well-known in the art, such as Votators ®. Preferred cross-linked starches are selected from the group consisting of di-starch phosphate, di-starch adipate, acetylated di-starch adipate, hydroxypropyl di-starch phosphate, and acetylated di-starch phosphate. Certain modified starches, such as enzymatically, acid or alkaline hydrolized ones, are not adequate for the products according to the invention, as they dissolve too easily during the preparation of the product.

The cross-linked starches are particularly preferred in those cases where the emulsions are used for shallow-frying and where spattering should be prevented, since they are capable of withstanding high temperatures during the frying process.

Whatever starch is used, it is important to see to it that the starch particles are hydrated to a swelling degree which is less than the maximal degree of swelling, which can be reached for a particular kind of starch. If the starch particles are insufficiently swollen during this heat treatment, they may impart an undesirable mealy sensation in the mouth. If the starch particles swell beyond the "maximal degree of swelling", they will disintegrate into debris or become too weak to withstand shearing forces during a margarine preparation process. The most adequate sub-maximal degree of swelling can easily be determined experimentally for each particular starch.

The aqueous phase of the emulsion may contain, in addition to water, proteins such as milk proteins, salts such as sodium chloride, emulsifiers such as lecithin or monoglycerides, colouring materials, e.g. beta-carotene, thickening agents such as gelatin, preservatives such as sorbic acid etc., which are common ingredients for such emulsions.

The fat phase of the w/o emulsion spread may consist of any plastic fat blend suitable for producing margarines and fat spreads. Such a fat blend should have a plastic consistency within a temperature ranging from 5°–25° C. Such fat blends have levels of crystallized fat of at least about 8% at room temperature (20° C.). The fat solids profile of such fat blends should preferably be such that at mouth temperature substantially all the fat is molten, i.e. less than about 3% of the fat is present in crystallized form. Fat blends used for producing plastic emulsions in tropical areas should preferably have levels of crystallized, solid fat ranging from 5–8% at higher temperatures (e.g. 35° C.).

The fat components of the fat blend may consist of vegetable or animal fats which may be hydrogenated, interesterified or fractionated. Suitable animal fats may consist of butterfat, tallow or hydrogenated fish oil. Suitable vegetable fats may consist of palm oil, lauric fats such as coconut fat, palmkernel fat or babassu fat; further soybean oil, sunflower oil, rapeseed oil, cottonseed oil, maize oil and the like.

The process for the preparation of the edible w/o-emulsion spreads according to the invention comprises in its most general form:

(a) producing an emulsion from a fat phase constituting the continuous phase of the emulsion and an aqueous phase constituting the dispersed phase of the emulsion, 20–80% by volume of said dispersed phase being present in the form of intact, non-crystalline, undissolved, hydrated starch, the remainder of the volume of said dispersed phase being present as free aqueous phase; and (b) subjecting the emulsion thus obtained to a texturization treatment comprising cooling and working the emulsion to obtain a w/o-emulsion spread.

According to a preferred embodiment a process is carried out wherein:

(1) the starch is dispersed in the aqueous phase;

(2) the starch-containing aqueous phase is heated to hydrate the starch up to the point where it does not display birefrigeance any more while remaining undissolved and intact, the amount of added starch being such that the hydrated starch constitutes 15–80% by volume of the dispersed aqueous phase, the remainder of the volume of said dispersed phase being present as free aqueous phase;

(3) emulsifying the aqueous phase containing the hydrated starch with the fat phase;

(4) subjecting the emulsion thus obtained to a texturization treatment comprising cooling and working to obtain a w/o-emulsion spread.

It is however also possible to introduce the starch by incorporating it in the fatty phase before the addition of the aqueous phase or in a pre-emulsion of the fatty phase and the aqueous phase, whereafter the heat treatment is applied to hydrate the starch.

The heating time and temperature will depend on the kind of starch used and can be determined empirically in each particular case, bearing in mind that the starch particles should not be allowed to swell beyond their maximal degree of swelling whereby they would disintegrate and subsequently dissolve. The appropriate combination of heating time and temperature can be determined by examining the starch particles through a microscope in order to ascertain the presence or absence of birefrigence or by measuring to which extent the starch disintegrates or dissolves under a particular set of temperature/time conditions. If more than 10% of the starch dissolves in the aqueous phase, a lower temperature and/or a shorter heating time should be applied. For most starches a temperature within the range of 65°–95° C. and a heating time from 1–30 minutes will be adequate.

The emulsion obtained can be converted into a margarine or reduced fat spread in a conventional way, such as churning or processing, using a Votator ® apparatus in a way known per se, whereby the emulsion is cooled and worked to obtain a w/o-emulsion spread of the desired texture and plasticity.

The present invention makes it possible to improve the spattering behaviour of w/o-emulsions, particularly of the margarine-type for shallow frying, by incorporating therein or causing to be formed therein a suitable amount of intact, non-crystalline starch particles hydrated to a sub-maximal swelling degree.

The present invention also makes it possible to improve the release and perception of flavouring agents, particularly salt, or sugars during the consumption of w/o-emulsions of the margarine-type, the reduced fat spread-type and/or particularly tropical margarines. Such margarines, which are described in European patent application No. 80201080.1, should be stable at 25°–45° C. and therefore contain a relatively high amount of high-melting fats which can contain 5–8% of solid fat at a temperature of 35° C. These high-melting fats are responsible for the emulsion not breaking easily in the mouth, as a result of which salt and other water-soluble or water-dispersible flavouring agents are insufficiently released and perceived.

The new emulsions, their preparation and the new uses in w/o-emulsions of non-crystalline, intact starch particles hydrated to a sub-maximal degree to improve the spattering behaviour and the organoleptic properties, will be explained in more detail in the following Examples.

EXAMPLE I

A margarine was prepared, starting from an aqueous phase having the following composition:

|  | % by weight |
| --- | --- |
| Water | 16.7 |
| Sodium chloride | 1.0 |
| Skimmilk powder | 0.4 |
| Potassium sorbate | 0.05 |
| Citric acid | 0.007 |
| Modified maize starch diphosphate (Snowflake ® 05311) | 1.0 |

The aqueous phase was heated for 10 minutes at 80° C., after which period the hydrated starch and the hydrated particles were intact and less than 2% dissolved in the aqueous phase.

About 30% (by volume) of the aqueous phase consisted of the hydrated starch particles. This percentage was determined by centrifuging the total dispersed phase (starch+free aqueous phase) at 700 x g for 5 minutes and measuring the volume of the supernatant (free aqueous phase) and the volume of the hydrated starch particles while applying a correction for the fact that the hydrated starch particles (the sediment) contained about 20% of free aqueous phase.

The amount of dissolved starch was measured by a colorimetric method, using phenol and sulphuric acid according to Dubois et al Anal. Chem. 28, 350 (1956).

Upon microscopic examination, using polarized light, the hydrated starch particles showed no birefringence. The diameter of the starch particles before swelling varied from 10-25 microns and after swelling from 20-48 microns. The aqueous phase was cooled to 35° C. and was emulsified with a fatty phase of the following composition:

|  | % by weight |
| --- | --- |
| Monoglyceride | 0.067 |
| Lecithin | 0.2 |
| Beta-carotene (20%) | 0.001 |
| Fat | 80.575 |

The fat consisted of 40% fish oil hydrogenated to a melting point of 39° C., 33% soybean oil and 27% soybean oil hydrogenated to a melting point of 30° C. The fatty phase displayed the following solid fat profile, determined by nuclear magnetic resonance:

$N_{10°C.}=42; N_{20°C}=24; N_{30°C.}=7.5; N_{35°C.}=1.5.$

The fatty phase was emulsified with the aqueous phase and texturized in a Votator unit. The margarine obtained was submitted to a panel of experts who judged the spattering behaviour and the release and perception of salt as compared with a margarine of the same composition which, however, contained no hydrated starch particles as defined above.

The margarine according to the invention was in both respects better than the margarine used for comparison.

The spattering test was carried out, using a frying pan wherein 25 g margarine was heated to 180° C. During the frying process a filter paper was held above the pan. The amount of oil on the filter paper was judged visually and expressed in a spattering mark, using an arbitrary scale between 10 (no spattering—no oil on the filter paper) and 0 (considerable spattering—filter paper is fully stained).

The margarine according to the invention had a score of 9-10, whereas a margarine without the hydrated starch had a score of 7.

The salt release properties of the margarine produced according to the invention were compared with a reference margarine, which did not contain the hydrated starch, by a panel of 10 persons. The panel unanimously found that the margarine produced according to the invention released salt more quickly and more completely than the reference margarine.

It is important to mention that the improvement by the method described does not affect the plastic range of the spread, nor its stability to oil separation in the higher temperature range.

The microbiological stability of the margarine produced according to the invention was assessed in comparison with a margarine without hydrated starch wherein the dispersed aqueous phase had a comparable coarse structure (droplet size about 25 microns), after a period of storage of 6 weeks at 20° C.

The margarine according to the invention displayed no growth of micro-organisms, whereas the margarine without hydrated starch was completely spoiled.

A further test was carried out on margarines according to the invention which were deliberately infected with enterobacteria and yeasts, respectively, before processing in the Votator ® apparatuses.

After a storage period of 6 weeks at 20° C., the microorganism count had decreased from the original $10^2/1$ g product to 30/1 g of product.

A reference margarine of the same composition but without hydrated starch (but having a comparable coarse structure of the aqueous phase; average droplet size about 25 microns) and infected by the same microorganisms displayed an increase in counts from the original $10^2$/g product to $2.10^6$/g of product.

EXAMPLE II

Example I was repeated, except that 2.0% of natural rice starch was used (the amount of fat used was correspondingly lowered to 79.55%), which was heated at 75° C. for 5 minutes. After this period of time birefringence had disappeared. Approximately 70% by volume of the dispersed phase consisted of the hydrated starch particles.

The diameter of the rice starch particles was between 4 and 7 microns before swelling and between 8 and 15 microns after swelling. About 4% of the starch was present in the dissolved state in the aqueous phase.

A comparison with margarine of the same composition but without starch, showed that the margarine according to the invention was better with respect to both the spattering behaviour (although the difference with the reference margarine was less pronounced than in the case where the modified maize starch according to Example I was used) and the organoleptic properties.

The results of the microbiological tests were similar to those obtained in Example I and clearly showed the superiority of the margarine produced using hydrated starch, compared with a reference of similar water dispersion.

EXAMPLE III

Example I was repeated, except that a fat consisting of 80% palm oil, 10% palm oil hydrogenated to 47° C. and 10% palmkernel oil was used for the preparation of a margarine usually sold in tropical areas.

The solid fat profile was as follows:

$N_{10°C.}=53.1; N_{20°C.}=26.2; N_{30°C.}=10.2; N_{35°C.}=6.0.$

A comparison with a margarine of the same composition but without starch, showed that the release of salt upon consumption and the spattering behaviour of the starch-containing margarine were superior.

Both the test and reference margarines showed virtually the same hardness throughout the range of adequate plasticity (15°-35° C.) while both were free of oil separation up to 40° C. during prolonged storage.

The results of the microbiological tests were similar to those obtained in Example I and clearly showed the superiority of the margarine produced using hydrated starch.

EXAMPLE IV

A reduced fat spread was produced from a fat blend consisting of 20% palm oil hydrogenated to a melting point of 43° C. and 80% soybean oil.

The fat solids profile determined by nuclear magnetic resonance (NMR) was:

$N_{10° C.} = 17; N_{20° C.} = 10; N_{35° C.} = 1.0.$

A water-in-oil emulsion spread was produced with the following composition:
39.7% of the above fat blend
0.2% distilled monoglyceride (Dimodan P ®)
0.1% soy lecithin
6 ppm beta-carotene + flavour
0.7% salt
4.0% acetylated distarch adipate (purity HPC)
0.1% K-sorbate
0.05% citric acid
55.15% water The emulsion was texturized in a Votator ® to produce a spread.

The salt release properties and the spattering behaviour were assessed as described in Example I, in comparison with a reduced fat spread of the same composition but wherein the starch had been replaced by fat.

On the arbitrary scale the spread according to the invention scored a 10 for spattering behaviour, whereas the reference spread scored a 6. A trained panel of 16 persons judged the salt release of the spread according to the invention to be faster and more complete compared with the reference.

Microbiological experiments carried out as described in Example I showed a clear superiority of the spread according to the invention when compared with the reference spread, which did not contain starch.

EXAMPLE V

A margarine was produced essentially as described in Example I and using the same aqueous phase as in Example I which was emulsified with a fat blend consisting of 18% soybean oil, 19% coconut oil, 28% rapeseed oil hydrogenated to a melting point of 30° C. and 35% hydrogenated fish oil hydrogenated to a melting point of 39° C. The fat solids profile was as follows:

$N_{10° C.} = 50.2; N_{20° C.} = 25.0; N_{30° C.} = 7.4; N_{35° C.} = 1.5.$

An emulsion consisting of 50% by weight of margarine and 50% by weight of sugar syrup was produced, which was subsequently whipped to produce a cream for bakery purposes.

This cream was compared with a cream which was prepared from an emulsion of the same composition, except that the starch was replaced by an aquivalent amount of fat.

The cream produced according to the invention had a lighter texture and easier melting properties in the mouth.

We claim:

1. An edible water-in-oil emulsion spread comprising a continuous fat phase and a dispersed phase, of which 15-80% by volume of the dispersed phase is present in the form of undissolved, intact, non-crystalline, hydrated starch, the remainder of the volume of said dispersed phase being present as free aqueous phase.

2. An edible emulsion according to claim 1, wherein the hydrated starch constitutes 25-70% by volume of the dispersed phase.

3. An edible emulsion spread according to claim 2, wherein the hydrated starch constitutes 35-60% by volume of the dispersed phase.

4. An edible emulsion spread of the margarine-type according to claim 1, wherein the fatty phase constitutes 80-90% by weight and the hydrated starch 1.5-16% by weight, based on the total weight of the emulsion, the remainder up to 100% by weight consisting of free aqueous phase.

5. An edible emulsion of the reduced fat spreadtype according to claim 1, wherein the fatty phase constitutes 20-70% by weight and the hydrated starch constitutes 4.5 to 64% by weight, based on the total weight of the emulsion, the remainder up to 100% by weight consisting of free aqueous phase.

6. An edible emulsion according to claim 1, wherein the hydrated starch particles have a diameter of 3 to 100 microns.

7. An edible emulsion according to claim 6, wherein the hydrated starch particles have a diameter ranging from 20-60 microns.

8. An edible emulsion according to claim 1, wherein the starch particles originate from natural starch.

9. An edible emulsion according to claim 8, wherein the starch particles originate from starch, selected from the group consisting of rice starch, oat starch, corn starch and wheat starch.

10. An edible emulsion according to claim 1, wherein the starch consists of cross-linked starch.

11. An edible emulsion according to claim 10, wherein the cross-linked starch is selected from the group consisting of di-starch phosphate, acetylated di-starch adipate, hydroxypropyl di-starch phosphate, and acetylated di-starch phosphate.

12. An edible emulsion according to claim 1, wherein the fatty phase has a plastic consistency within a temperature ranging from 15°-35° C.

13. A process for the preparation of an edible w/o-emulsion spread comprising
    (a) producing an emulsion from a fat phase constituting the continuous phase of the emulsion and an aqueous phase constituting the dispersed phase of the emulsion, 20-80% by volume of said dispersed phase being present in the form of intact, non-crystalline, undissolved, hydrated starch, the remainder of the volume of said dispersed phase being present as free aqueous phase; and
    (b) subjecting the emulsion thus obtained to a texturization treatment comprising cooling and working the emulsion to obtain a w/o-emulsion spread.

14. A process according to claim 13, wherein the emulsion is prepared by
    (1) dispersing the starch in the aqueous phase;
    (2) heating the starch-containing aqueous phase to hydrate the starch to the point where it no longer displays birefrigence while remaining undissolved and intact, the amount of added starch being such that the hydrated starch constitutes 15-80% by volume of the dispersed aqueous phase, the remainder of the volume of said dispersed phase being present as free aqueous phase;

(3) emulsifying the aqueous phase containing the hydrated starch with the fat phase.

15. A process according to claim 13, wherein starch in incorporated either in the fatty phase, which is subsequently mixed with the aqueous phase, or it is incorporated in the emulsion, whereafter the heat treatment is applied to hydrate the starch.

16. A process according to claim 13, wherein the starch is hydrated by heating the aquous phase containing starch at a temperature varying from 65°–95° C. for 1–30 minutes.

17. A process according to claim 13, wherein the emulsion contains a fat which at 35° C. contains 5–8% solid fat.

* * * * *